US008412000B2

(12) United States Patent
Elliott

(10) Patent No.: US 8,412,000 B2
(45) Date of Patent: Apr. 2, 2013

(54) SYSTEM AND METHOD FOR REDUCING MOTION ARTIFACTS BY DISPLAYING PARTIAL-RESOLUTION IMAGES

(75) Inventor: Keith Harold Elliott, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1362 days.

(21) Appl. No.: 11/948,893

(22) Filed: Nov. 30, 2007

(65) Prior Publication Data

US 2009/0141980 A1 Jun. 4, 2009

(51) Int. Cl.
*G06K 9/32* (2006.01)

(52) U.S. Cl. ......................... 382/299; 382/300; 382/275

(58) Field of Classification Search .................. 382/190, 382/275, 298, 299, 300
See application file for complete search history.

(56) References Cited

U.S. PATENT DOCUMENTS

| | | | | |
|---|---|---|---|---|
| 5,767,987 | A * | 6/1998 | Wolff et al. | 358/447 |
| 6,262,774 | B1 | 7/2001 | Schu et al. | |
| 7,428,019 | B2 * | 9/2008 | Irani et al. | 348/581 |
| 8,055,101 | B2 * | 11/2011 | Intwala | 382/299 |
| 2002/0015525 | A1 * | 2/2002 | Fujiwara | 382/182 |
| 2003/0012457 | A1 * | 1/2003 | Solecki | 382/299 |
| 2004/0114829 | A1 * | 6/2004 | LeFeuvre et al. | 382/275 |
| 2006/0008138 | A1 * | 1/2006 | Zhou et al. | 382/159 |
| 2007/0110285 | A1 * | 5/2007 | Hanna et al. | 382/117 |
| 2008/0131028 | A1 * | 6/2008 | Pillman et al. | 382/299 |

OTHER PUBLICATIONS

"Micronas," http://www.micronas.com/products/by_function/frc_9wxym/product_information/index.html, downloaded Nov. 30, 2007, 3 pages, Micronas.

Hutchison, D.C., "The SmoothPicture Algorithm: An Overview," Digital TV DesignLine, Feb. 21, 2007, 4 pages, Texas Instruments, Dallas, TX.

FRC 9wxyM Full-HD Frame Rate Converter with Motion Blur Removal and Film De-Juddering for 1080p 100/120 Hz LCD TVs, Micronas GmbH, Apr. 18, 2007, pp. 2.

* cited by examiner

*Primary Examiner* — John Strege

(74) *Attorney, Agent, or Firm* — Warren L. Franz; Wade J. Brady, III; Frederick J. Telecky, Jr.

(57) ABSTRACT

A method for reducing motion artifacts and the systems for implementing the same are provided. The method includes receiving a full-resolution image at a first time point; extracting a first partial-resolution image from the full-resolution image; and calculating a second partial-resolution image for a second time point after the first time point. The first and the second partial-resolution images are complementary.

15 Claims, 4 Drawing Sheets

SYSTEM AND METHOD FOR REDUCING MOTION ARTIFACTS BY DISPLAYING PARTIAL-RESOLUTION IMAGES

TECHNICAL FIELD

This application relates generally to television display systems, and more particularly to methods for reducing motion artifacts and systems for implementing the same.

BACKGROUND

Televisions (or monitors) typically display images in the form of image frames, which are continuously refreshed, for example, with a 50 Hz or 60 Hz frame rate. Some of the televisions such as ones using spatial light modulator (SLM) light processing technology, typically use the entire frame time ($t_f$, the time separating the receipt of new images) to display each image.

When there is motion in images, a viewer will unconsciously "track" the motion across the screen with his/her eyes. This eye-tracking causes the viewer's retina to move while the television is trying, in essence, to "paint" the image on the viewer's retina. This causes the viewer to perceive motion artifacts in the images. Depending on the amount of motion, a variety of motion artifacts such as image softening/blurring, boundary dispersion artifacts, pulse width modulation (PWM) artifacts, color separation, and the like, can be generated.

These motion artifacts can be significantly reduced by increasing the frame rate of the images. This reduces the amount of time that an individual image is displayed on a viewer's retina, thus reducing the opportunity for eye-tracking to generate the artifacts. It is hence preferable to have a high frame rate on televisions, especially those using SLM technologies.

Various methods have been explored to increase the frame rate. However, the existing techniques cause a significant increase in processing bandwidth and system complexity. For example, TV manufacturers have used a number (two or more) of individual frames of "real" data to calculate a new image, and to interpolate (or extrapolate) the new image between two existing images. As a result, the frame rate is essentially at least doubled. For example, frames of 60 Hz frame rate have a frame time of 16.67 milliseconds. By interpolating a new image between each pair of real images, the frame rate may be doubled to 120 Hz. Accordingly, the display time for each image is reduced to about 8.33 milliseconds. The motion artifacts are thus reduced.

The above-discussed solution suffers drawbacks, however, when the frame rate is doubled, for example, from 60 Hz to 120 Hz. This not only requires the calculation bandwidth to be doubled, but also requires all of the downstream video processing, such as any subsequent signal processing and the final display processing of the TV itself, to support the increased bandwidth. The circuitry for processing the images will also have to process twice the bandwidth or more. Therefore, the costs for designing and manufacturing the respective circuitry is increased.

SUMMARY

In accordance with one aspect of the present application, a method for reducing motion artifacts includes receiving a full-resolution image at a first time point; extracting a first partial-resolution image from the full-resolution image; and calculating a second partial-resolution image for a second time point after the first time point, wherein the first and the second partial-resolution images are complementary. The method further includes calculating more partial-resolution images for forming the full-resolution image.

In accordance with another aspect of the present application, a method for reducing motion artifacts includes receiving a plurality of images, wherein the plurality of images comprises a first full-resolution image and a second full-resolution image with a time interval therebetween, and wherein the second full-resolution image is immediately behind the first full-resolution image; displaying a first half-resolution image, wherein the first half-resolution image is extracted from the first full-resolution image; and displaying a second half-resolution image complementary to the first half-resolution image, wherein the second half-resolution image is not extracted from the first or second full-resolution image.

In accordance with yet another aspect of the present application, a method for reducing motion artifacts includes receiving a plurality of images with an interval between consecutive ones of the plurality of images, wherein the plurality of images comprises a full-resolution image; extracting a first half-resolution image from the full-resolution image, wherein the first half-resolution image has a checkerboard pattern, with alternative pixels in each row and each column of the full-resolution image masked; predicting a second half-resolution image using the first full-resolution image and images received close to the receiving time of the first full-resolution image, either before or after, wherein the second half-resolution image is complementary to the first half-resolution image; displaying the first half-resolution image at a first time point; and displaying the second half-resolution image at a second time point after the first time point, wherein the second time point is later than the first time point by half an interval.

In accordance with yet another aspect of the present application, a system for reducing motion artifacts includes a partial-resolution image extractor configured to extract a first partial-resolution image from a full resolution image; and a partial-resolution image calculator configured to calculate a second partial-resolution image complementary to the first partial-resolution image, wherein the second partial-resolution image is a predicted image. The partial-resolution image calculator may further calculate more partial-resolution images for forming the full-resolution image.

In accordance with yet another aspect of the present application, a system for reducing motion artifacts includes a half-resolution image extractor configured to extract a first half-resolution image from a full resolution image; a half-resolution image calculator configured to generate a calculated full-resolution image, and to extract a second half-resolution image complementary to the first half-resolution image from the calculated full-resolution image; and a display panel coupled to the half-resolution image extractor and the half-resolution image calculator, wherein the display panel is configured to display the first and the second half-resolution images.

Advantageous features of embodiments include reduced motion artifacts without doubling the bandwidth.

The foregoing has outlined rather broadly the features and technical advantages of the present application in order that the detailed description of the present application that follows may be better understood. Additional features and advantages of the embodiments will be described hereinafter which form the subject of the claims of the present application. It should be appreciated by those skilled in the art that the conception and specific embodiments disclosed may be readily utilized as a basis for modifying or designing other structures or processes for carrying out the same purposes of the present application. It should also be realized by those skilled in the art that such equivalent constructions do not depart from the spirit and scope of the present application as set forth in the appended claims.

BRIEF DESCRIPTION OF THE DRAWINGS

For a more complete understanding of the present application, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present application provides many applicable inventive concepts that can be embodied in a wide variety of specific contexts. The specific embodiments discussed are merely illustrative of specific ways to make and use the teaching in the present application, and do not limit the scope of the present application.

The embodiments will be described in a specific context, namely a digital light processing display system, which is a projection display system utilizing micro-mirrors. However, the embodiments of the present application may be applied to other display systems, such as transmissive and reflective liquid crystal, liquid crystal on silicon, flat panel displays (such as LCD and plasma), cathode ray tube (CRT), and the like.

Figure 1:
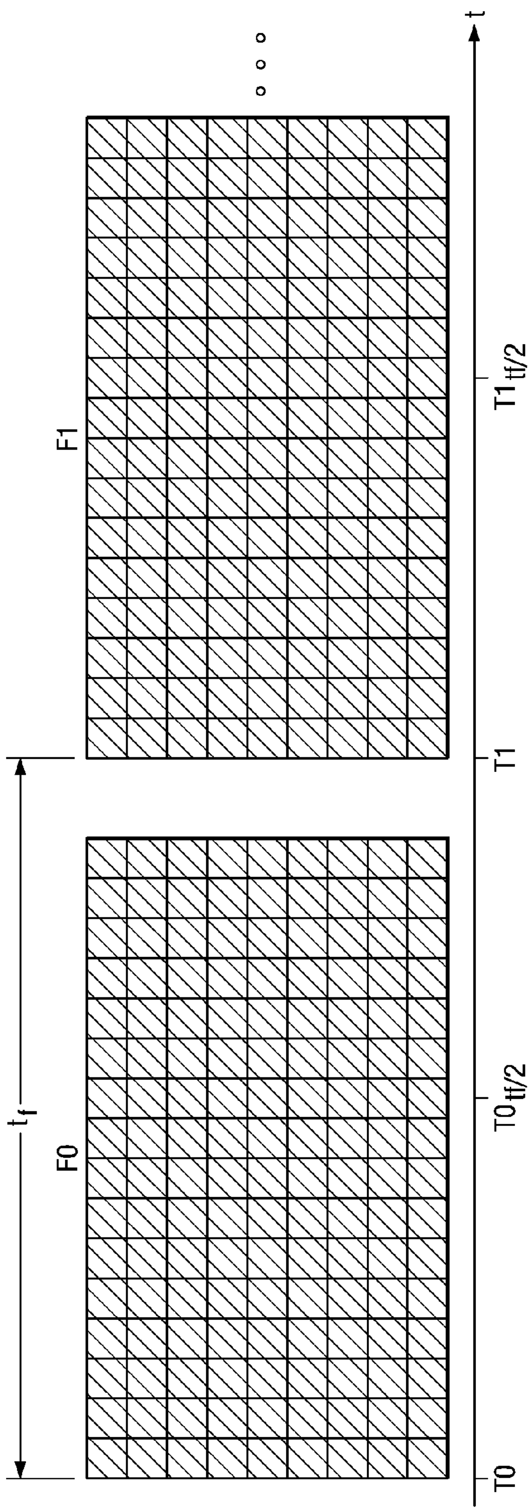
FIG. 1 schematically illustrates consecutively received input images, with each image having an array of pixels.

Images displayed on display panels are in the form of pixel arrays, and are typically referred to as image frames. Existing display panels support various resolutions. In the following discussed examples, a high resolution of 1920 (columns)×1080 (rows) is used as an example, although the embodiments of the present application are readily applicable to images with other resolutions with different numbers of rows and columns of pixels. Typically, images are inputted and displayed in a fixed frame rate, for example, 50 Hz or 60 Hz. FIG. 1 illustrates two of the consecutive input images, which may be in a continuous image flow. The image received at time T0 is referred to as image F0, and the image received at time T1 is referred to as image F1. At an exemplary 60 Hz frame rate, the frame time $t_f$ is about 16.667 milliseconds. Each of the images F0 and F1 includes a pixel array having 1920×1080 pixels, and are referred to as full-resolution images throughout the description.

Figure 2:
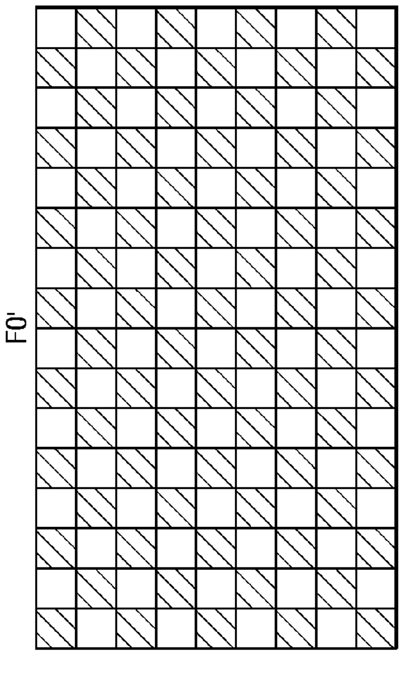
FIG. 2 illustrates a first half-resolution image extracted from a full-resolution image, wherein the pixels in the half-resolution image have a checkerboard pattern.

FIG. 2 illustrates the extraction of a partial-resolution image, in this example, half-resolution image F0'. Throughout the description, half-resolution images are used to explain the concept of the present application. However, other images with other partial resolution, such as quarter-resolution images, may also be used, as will be discussed in detail in subsequent paragraphs. Preferably, half-resolution image F0' is extracted by masking alternative pixels in each row and each column of image F0. The remaining pixels (unmasked pixels) form a checkerboard pattern. The masked pixels are preferably blackened, and are shown as non-illuminated pixels on the display panel. In FIG. 2, the masked pixels are shown as white squares, while the unmasked pixels are shown as lightly shaded squares.

Alternatively, instead of having a checkerboard pattern, the unmasked pixels may have other patterns, for example, in each row, with two masked pixels followed by two unmasked pixels. Accordingly, in each row, the unmasked pixels may be aligned to an overlying row and/or an underlying row in different combinations.

Figure 4A:
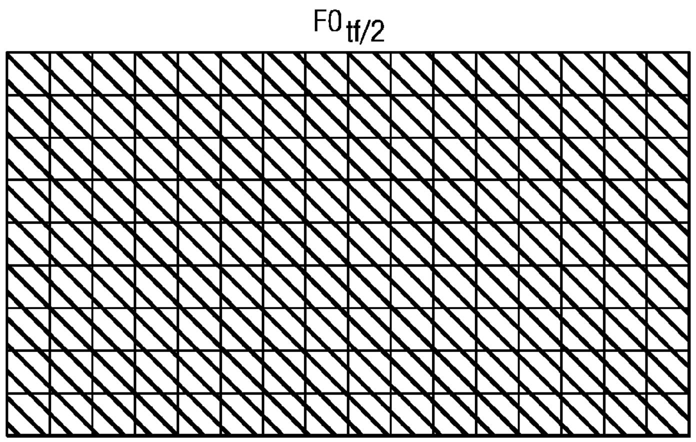
FIG. 4A schematically illustrates a full-resolution calculated image.

FIG. 4A schematically illustrates a calculated image F0$_{tf/2}$. Throughout the description, the terms "calculate" and "calculated image" are used to refer to images that are calculated, instead of being extracted, from the input images. Accordingly, if there is motion in the successive images, then at least one, and most likely more, pixel(s) in a calculated image will be different than the corresponding pixel(s) in the images they are calculated from.

Figure 3:
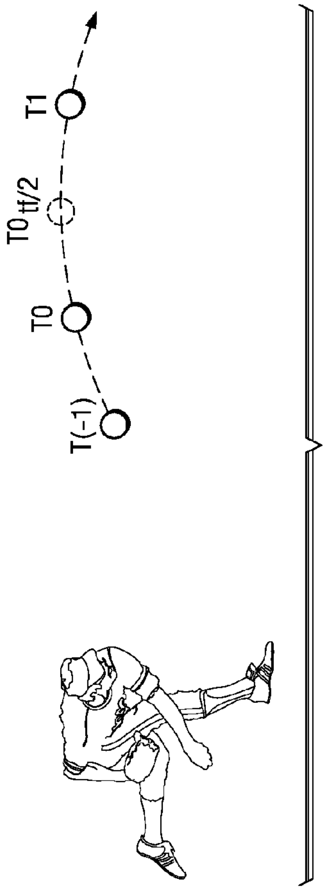
FIG. 3 illustrates an example of a relationship between a full resolution calculated image and the input images.

FIG. 3 illustrates an example explaining the concept of calculated image F0$_{tf/2}$. It is to be appreciated, however, that FIG. 3 merely shows an example, and various algorithms may be used to calculate images. Assuming a ball player throws a ball, at time T0, the ball is at a first position. The picture and the position of the ball at time T0 is captured in image F0. At time T1, the ball travels a distance and is at a second position. The picture and the position of the ball at time T1 is captured in image F1. Although the picture and the position of the ball at an intermediate time T0$_{tf/2}$ between times T0 and T1 are not captured, they can be calculated based on image F0 and images captured before time T0, such as the image captured at time T(−1). Alternatively, images F0 and F1 (and possibly including the images before time T0 or after time T1) may be used to calculate the picture and the position at the intermediate time T0$_{tf/2}$. In an exemplary embodiment, the calculated image F0$_{tf/2}$ (at time T0$_{tf/2}$) may be generated using a frame rate converter such as the FRC 9wxyM full-HD frame rate converter with motion blur removal and film de juddering available from Micronas.

FIG. 4A schematically illustrates a calculated image F0$_{tf/2}$ at time T0$_{tf/2}$. Preferably, time T0$_{tf/2}$ equals T0+$t_f$/2, wherein $t_f$ is the frame time, which is also the time difference between time points T0 and T1. The calculated image F0$_{tf/2}$ has a same resolution as input images F0 and F1.

Figure 4B:
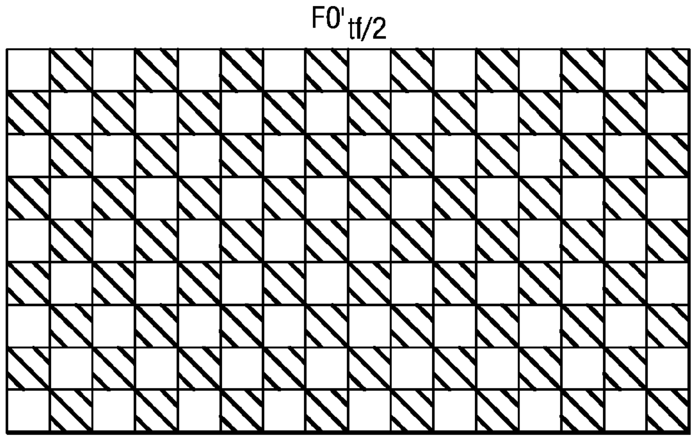
FIG. 4B illustrates a second half-resolution image extracted from the full-resolution calculated image, wherein the first and the second half-resolution images are complementary.

Next, a half-resolution image $F0_{tf/2}'$ is extracted from the calculated image $F0_{tf/2}$, as is shown in FIG. 4B. Again, half-resolution image $F0_{tf/2}'$ is extracted by masking alternative pixels in each row and each column of the pixels in the calculated image $F0_{tf/2}$. As a result, the remaining pixels also have a checkerboard pattern. The half-resolution image $F0_{tf/2}'$ is "complementary" to the half-resolution image F0', that is, the masked pixels in the half-resolution image $F0_{tf/2}'$ are unmasked in the half-resolution image F0', and vice versa. Throughout the description, the term "complementary" is used to refer to two or more partial-resolution images having no unmasked pixels directly overlapping each other. In FIG. 4B, the masked pixels are shown as white squares, while unmasked pixels are shown as heavily shaded squares. In alternative embodiments, the half-resolution image $F0_{tf/2}'$ may be calculated directly, without going through the step of calculating the calculated image $F0_{tf/2}$ first.

Note that since the half-resolution image $F0_{tf/2}'$ is calculated based on time $T0_{tf/2}$, which is later than time T0 by half of the frame time (for example, about 8.333 milliseconds for a 60 Hz input frame rate), the half-resolution image $F0_{tf/2}'$ and the half-resolution image F0' in combination have a frame rate of 120 Hz, which is twice the original 60 Hz input frame rate. It is realized that, although in the above-discussed exemplary embodiments, the new half-resolution image ($F0_{tf/2}'$) is calculated at the middle point between time T0 and T1, the half-resolution images may also be calculated at other time points other than the middle point, for example, at 7 milliseconds after T0. Accordingly, in this example, for best performance, the system should display the calculated image 7 milliseconds after T0 rather than displaying it at the middle point between T0 and T1.

Figure 5:
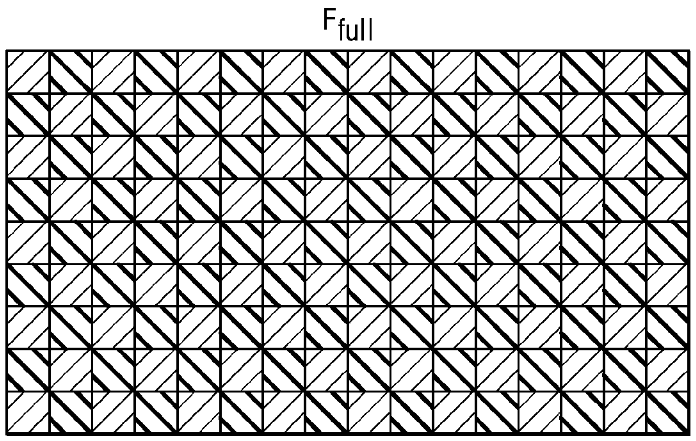
FIG. 5 illustrates a full-resolution image generated by combining the first and the second half-resolution images.

The half-resolution image $F0_{tf/2}'$ and the half-resolution image F0' are then combined to form a full-resolution image $F_{full}$, as is shown in FIG. 5. Since the half-resolution image $F0_{tf/2}'$ and the half-resolution image F0' are complementary, all pixels in image $F_{full}$ will have data. The pixels in image $F_{full}$ are either from the half-resolution image $F0_{tf/2}'$, or from the half-resolution image F0', and are alternatively allocated in each row and each column. After the combination, the frame rate is reduced to the original input frame rate, for example, 60 Hz.

The full-resolution image $F_{full}$ may then be sent for further processing and displaying. In the preferred embodiment, the full-resolution image $F_{full}$ is processed by a SmoothPicture™ (a trademark of Texas Instruments Incorporated) processing unit. The existing SmoothPicture™ processing unit has the built-in function of dividing the full-resolution image $F_{full}$ back into half-resolution image $F0_{tf/2}'$ and half-resolution image F0'. Advantageously, by dividing the full-resolution image F0', images may be displayed using a spatial light modulator having half the number of pixels than the input images.

The input frame time $t_f$ is divided into two half frame times $t_f/2$. At time T0, half-resolution image F0' is sent to be displayed. At time $T0_{tf/2}$, which is equal to $T0+t_f/2$, the half-resolution image $F0_{tf/2}'$ is displayed. One skilled in the art will realize that although the receiving of image F0 and the displaying of half-resolution image $F0_{tf/2}'$ are both referred to as being at time T0, the processing of images takes time, and hence the real display time of image F0' may be slightly delayed from the time image F0 is received. Advantageously, in the case where digital micro-mirror device light processing technology is used, the number of micro-mirrors in the respective spatial light processor only needs to be half of that of the input image F0. Preferably, when image $F0_{tf/2}'$ is displayed, the micro-mirrors horizontally shift a pixel from where image F0' is displayed, so that the pixels in images F0' and $F0_{tf/2}'$ will not directly overlap the same positions. The resulting on-screen display contains all of the pixels in the image frame $F_{full}$, and is constructed within one $t_f$ frame time, which is 16.667 milliseconds for a 60 Hz frame rate. This embodiment advantageously utilizes existing SmoothPicture™ designs to achieve the display of half-resolution image F0' and half-resolution image $F0_{tf/2}'$ at different times, thus less design cost and complexity are involved.

Alternatively, other types of displays, such as transmissive and reflective liquid crystal, liquid crystal on silicon, cathode ray tube (CRT), and the like, may be used to display full-resolution image $F_{full}$, which has a same frame rate as input frames F0 and F1. However, in this case, both half-resolution image F0' and half-resolution image $F0_{tf/2}'$ may be displayed simultaneously. Even so, due to the existence of half-resolution image $F0_{tf/2}'$, which is an intermediate image between T0 and T1, it may still be beneficial to the reduction of the motion artifacts.

Figure 6A:
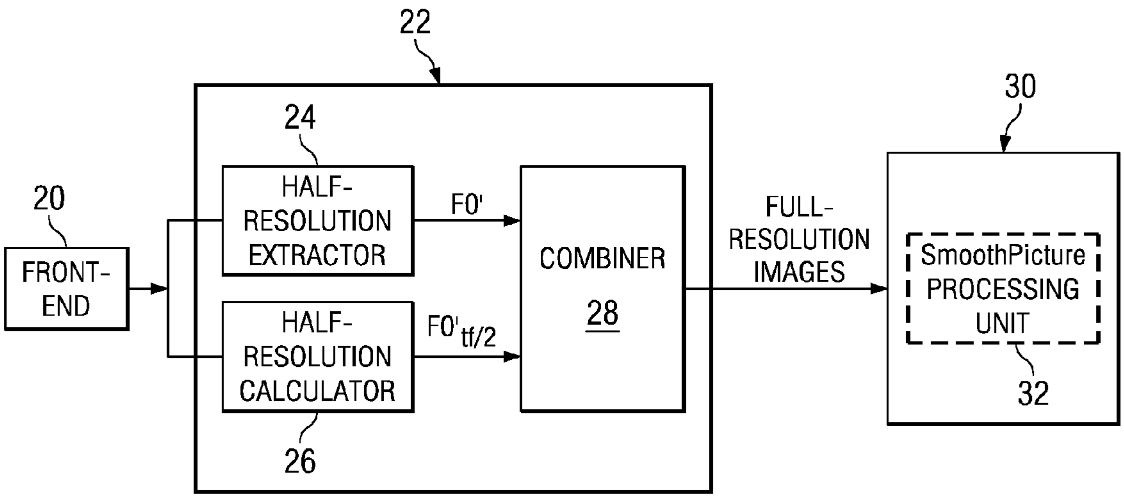
FIG. 6A illustrates a flow-chart of an embodiment, wherein the first and the second half-resolution images are combined before they are displayed.
Figure 6B:
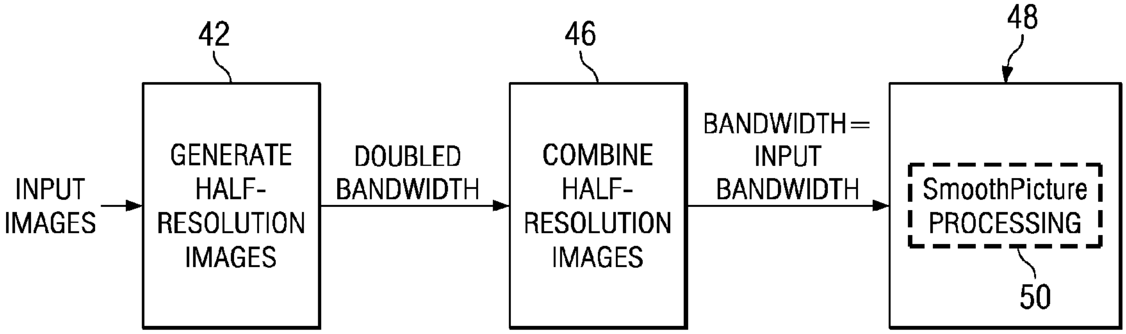
FIG. 6B illustrates a block diagram of a system for performing the flow shown in FIG. 6A.

FIG. 6A is a block diagram of a system for performing the above-discussed embodiment, and the respective steps are shown in FIG. 6B. Referring to FIG. 6A, after the input images are received from the front end unit 20, the input images are processed by controller 22, which includes half-resolution (image) extractor 24 and half-resolution (image) calculator 26. The front end 20 may receive images from game consoles, simulators, or any other applications. As discussed in the preceding paragraphs, half-resolution image extractor 24 extracts half-resolution image F0' from image F0 (refer to FIGS. 1 and 2). Half-resolution image calculator 26 calculates and interpolates full-resolution calculated image $F0_{tf/2}$ (refer to FIG. 4A), and then extracts the half-resolution image $F0_{tf/2}'$ (refer to FIG. 4B) from the calculated image $F0_{tf/2}$ (block 42 in FIG. 6B). Alternatively, the half-resolution image $F0_{tf/2}'$ may be calculated directly, without going through the step of calculating the calculated image $F0_{tf/2}$ first. The half-resolution images F0' and $F0_{tf/2}'$ are then combined by combiner 28 (also refer to block 46 in FIG. 6B), and the resulting image $F_{full}$ has a same frame rate as the input frames. Image $F_{full}$ is then processed and sent for displaying by unit 30 (also refer to block 48 in FIG. 6B), wherein unit 30 may be SmoothPicture™ processing unit 32 (also refer to block 50 in FIG. 6B).

Figure 7:
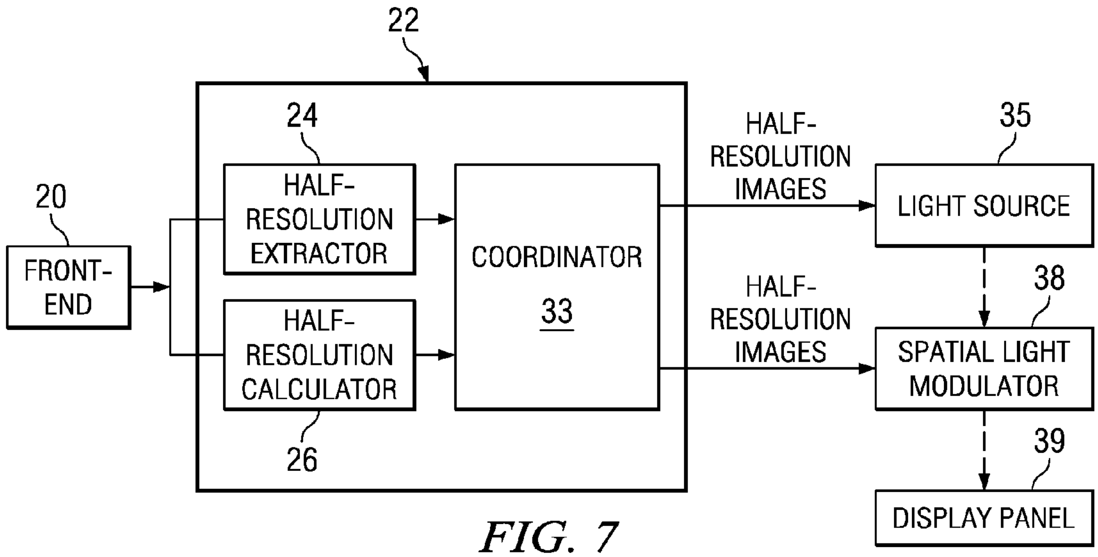
FIG. 7 illustrates a block diagram of an alternative embodiment, wherein the first and the second half-resolution images are displayed without being pre-combined.

FIG. 7 illustrates a block diagram of an alternative embodiment, wherein the half-resolution image F0' and half-resolution image $F0_{tf/2}'$ are displayed directly without being pre-combined. In the exemplary embodiment shown in FIG. 7, controller 22 includes coordinator 33, which coordinates the loading of images F0' and $F0_{tf/2}'$ into display panel 39. In the case where the display system uses the digital light processing technology, images F0' and $F0_{tf/2}'$ are first loaded into spatial light modulator 38, more specifically an array of spatial light modulators 38, wherein individual light modulators in the array of spatial light modulators 38 assume a state corresponding to a pixel state for an image being displayed. The array of spatial light modulators 38 is preferably a digital micro-mirror device (DMD) with each light modulator being a positional micro-mirror. In display systems where the light modulators in the array of spatial light modulators 38 are micro-mirror light modulators, the light from light source 35 may be reflected away from or towards display panel 39. A combination of the reflected light from the light modulators in the array of spatial light modulators 38 produces images corresponding to the images F0' and $F0_{t/f2}'$. Preferably, the functions of controller 22 may be built-in as an application specific integrated circuit (ASIC) for improved processing speed.

Figure 8:
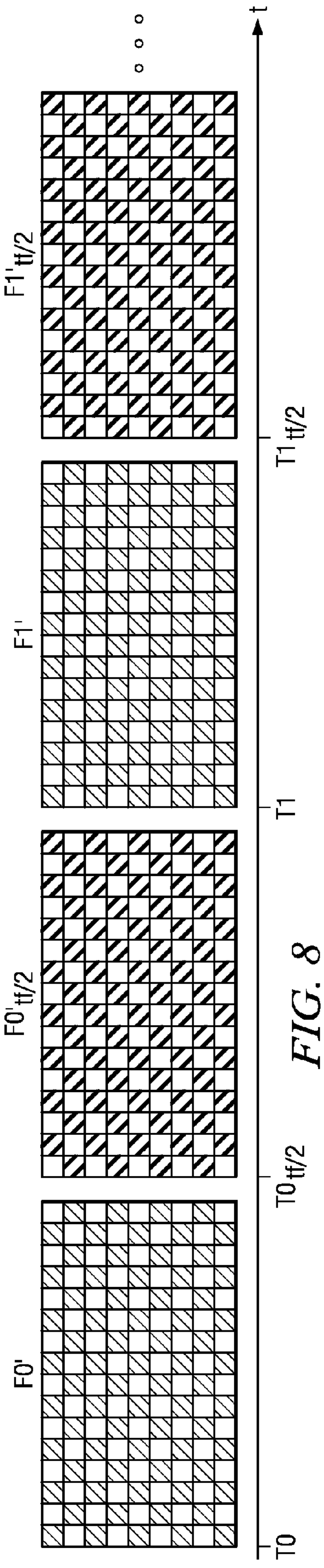
FIG. 8 illustrates a sequence of displayed half-resolution images, wherein each of the input images is processed to generate two half-resolution images.

The above-discussed processing is repeated for each of the input images, such as F0 and F1. Accordingly, for each of the input images, two half-resolution images, which are complementary to each other, are generated and displayed, and are either combined into a single image, or displayed individually. FIG. 8 illustrates an exemplary sequence of the displayed images, wherein the time sequence is from left to right. Similar to image F0, half-resolution image F1' and half-resolution image $F1_{tf/2}'$ are generated for image F1, wherein image F1' is displayed at time T1, and image $F1_{tf/2}'$ is displayed at time T1', preferably equal to T1+$t_f$/2, wherein time $t_f$ is the frame time of input frames F0 and F1.

Figure 9:
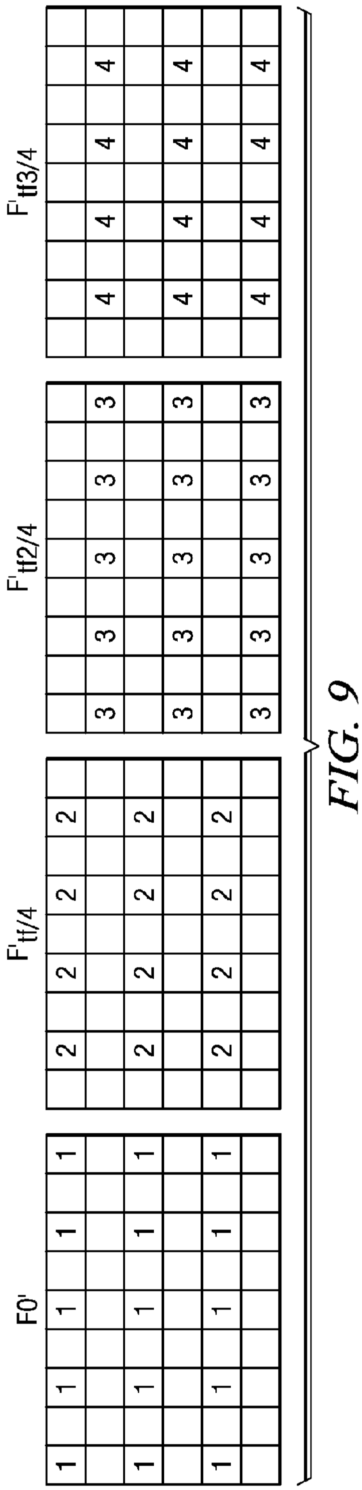
FIG. 9 illustrates four complementary quarter-resolution images.

The partial-resolution images may have other forms other than half-resolution. In an exemplary embodiment, a SmoothPicture2™ (a trademark of Texas Instruments Incorporated) processing unit may be used. The SmoothPicture2™ processing unit may display four pixels per micro-mirror, wherein the four pixels do not directly overlap each other. Accordingly, as is shown in FIG. 9, for each input image F0, a quarter-resolution image F0' is extracted, which contains only a quarter of the pixels in input image F0, while the other three quarters of pixels are masked. The numbers in FIG. 9 indicate that the pixel is unmasked. Additional three quarter-resolution images, namely $F0'_{tf/4}$, $F0't_{f2/4}$, and $F0'_{tf3/4}$, need to be calculated. The quarter-resolution images F0', $F0'_{tf/4}$, $F0'_{tf2/4}$, and $F0't_{f3/4}$ are complementary, and hence after being combined, will form a full-resolution image. The resulting quarter-resolution images thus have a frame rate four times the input frame rate. In later processing steps, the full-resolution image may be displayed as an entirety, or divided again back to four quarter-resolution images. The dividing function may be built in the controller as an ASIC, or implemented in the display system such as the SmoothPicture2™ processing unit.

Figure 10:
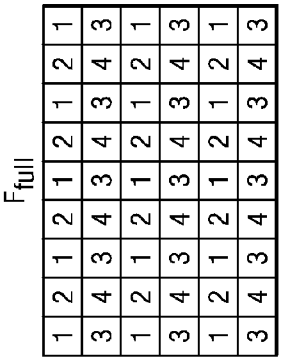
FIG. 10 illustrates a full-resolution image obtained by combining the four complementary quarter-resolution images shown in FIG. 9.

In an exemplary embodiment, each of the additional quarter-resolution images $F0'_{tf/4}$, $F0'_{tf2/4}$, and $F0'_{tf3/4}$ are calculated corresponding to the predicted pictures at the respective times T0+(T1−T0)/4, T0+(T1−T0)/2, and T0+3(T1−T0)/4. In other embodiments, the additional quarter-resolution images may be calculated for other intermediate time points other than the above-mentioned. It is appreciated that, in each of the quarter-resolution images, the masked and unmasked pixels may be arranged differently from what is shown in FIG. 9. The full-resolution image $F_{full}$ obtained by combining quarter-resolution images F0', $F0'_{tf/4}$, $F0'_{tf2/4}$, and $F0'_{tf3/4}$ is illustrated in FIG. 10, wherein the numbers indicate where the pixel data come from.

It is realized that more partial-resolution images (for example, eight, sixteen, etc.) may be extracted and calculated using the method provided in the preceding paragraphs.

Additionally, the functions of extracting images, calculating images and possibly combining images are built in a system outside game consoles or other applications such as simulators. For example, in televisions, the same functions may well be integrated into the game consoles. The output images from the game consoles will thus be the full-resolution images as shown in FIGS. 5 and 10, which include the calculated portions already. Accordingly, in FIG. 6A, the front end 20 and controller 22 will be built in the game consoles.

Various embodiments of the present application have several advantageous features. Since the calculated half-resolution image reflects the predicted movement of objects in real images, the motion artifacts are significantly reduced. This advantageous feature, however, is obtained without any penalty of increased bandwidth requirement, unlikely traditional solutions, which typically double the bandwidth. In addition, only half of the image data are interpolated, hence less memory may be required for the image processing. The embodiments of the present application are compatible with two-dimensional, three-dimensional, and dual-view display systems.

Although the present application and its advantages have been described in detail, it should be understood that various changes, substitutions and alterations can be made herein without departing from the spirit and scope of the present application as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present application, processes, machines, manufacture, compositions of matter, means, methods, or steps, presently existing or later to be developed, that perform substantially the same function or achieve substantially the same result as the corresponding embodiments described herein may be utilized according to the present application. Accordingly, the appended claims are intended to include within their scope such processes, machines, manufacture, compositions of matter, means, methods, or steps.

What is claimed is:

1. A method for processing images, the method comprising:

receiving first and second full-resolution images corresponding to first and second time points for consecutive display during first and second display time intervals at a given frame rate;

extracting a first partial-resolution image from one of the first and second full-resolution images;

from the first and second full-resolution images, calculating a second partial-resolution image corresponding to a third time point intermediate the first and second time points, wherein the first and the second partial-resolution images are complementary; and displaying the first and second partial-resolution images successively at different times during the first display time interval.

2. The method of claim 1, wherein the first and the second partial-resolution images are half-resolution images, and each has a checkerboard pattern.

3. The method of claim 1 further comprising:

calculating a third partial-resolution image corresponding to a fourth time point after the third time point and intermediate the first and second time points;

calculating a fourth partial-resolution image corresponding to a fifth time point after the fourth time point and intermediate the first and second time points, wherein the first, the second, the third and the fourth partial-resolution images are complementary; and displaying the third and fourth partial-resolution images successively at different times during the first display time interval, after display of the first and second partial-resolution images.

4. The method of claim 1, wherein the steps of receiving the first and second full-resolution images, extracting the first partial-resolution image, and calculating the second partial-resolution image are performed by a game console.

5. The method of claim 2, wherein displaying the first and second partial-resolution images includes combining the checkerboard patterns of the first and second partial-resolution images into a combined third full-resolution image; and then successively displaying the first and second partial-resolution images using the combined third full-resolution image.

6. The method of claim 3, wherein each of the first, the second, the third and the fourth partial-resolution images is a quarter-resolution image.

7. An image processing system comprising:

an input for receiving first and second full-resolution images corresponding to first and second time points for consecutive display during first and second display time intervals at a given frame rate;

a partial-resolution image extractor configured to extract a first partial-resolution image from one of the first and second full resolution images;

a partial-resolution image calculator configured to calculate, from the first and second full-resolution images, a second partial-resolution image complementary to the first partial-resolution image, wherein the second partial-resolution image corresponds to a third time point intermediate the first and second time points; and an output outputting the first and second partial-resolution images for displaying the first and second partial-resolution images successively at different times during the first display time interval.

8. The image processing system of claim 7, wherein each of the first and the second partial-resolution images is a half-resolution image, and has a checkerboard pattern.

9. The image processing system of claim 7, wherein the partial-resolution image calculator is further configured to:

calculate a third partial-resolution image corresponding to a fourth time point after the third time point and intermediate the first and second time points; and calculate a fourth partial-resolution image corresponding to a fifth time point after the fourth time point and intermediate the first and second time points, wherein the first, the second, the third and the fourth partial-resolution images are complementary.

10. The image processing system of claim 8, further comprising a processing unit configured to send the first and second partial-resolution images for display at the different times corresponding to twice the given frame rate.

11. A method comprising:

receiving a series of consecutive full-resolution image frames at a given frame rate, the received image frames including a first image frame F0 received at a first time T0 and a second image frame F1 received at a second time T1, each received image frame including pixel imaging data for display of respective pixels in a full-resolution image having a row×column pixel array;

extracting a first partial-resolution image from one of the first or second image frames by masking ones of pixels separated and leaving others of pixels unmasked in each row and column for that frame;

using pixel imaging data of the first and second image frames F0 and F1, calculating a third image frame including pixel imaging data for display of respective pixels in a full-resolution image having a row×column pixel array corresponding to an image representing picture subject matter and position at a third time, intermediate the first and second times T0 and T1;

extracting a second partial-resolution image from the third image frame by masking pixels corresponding to pixels left unmasked in the first partial-resolution image and leaving unmasked pixels corresponding to pixels masked in the first partial-resolution image; and displaying the first and second partial-resolution images successively at different times greater than the given frame rate, with unmasked pixels of the first and third image frames being displayed according to their pixel imaging data and masked pixels of the first and third frames not being displayed.

12. The method of claim 11, wherein the given frame rate is 50 Hz or 60 Hz.

13. The method of claim 12, wherein the first and second partial-resolution images are half-resolution or quarter-resolution images.

14. The method of claim 13, wherein the half-resolution or quarter-resolution images are formed with masked and unmasked pixels in complementary checkerboard patterns.

15. The method of claim 14, wherein the third image frame is an image frame $F0_{tf/2}$ corresponding to an image representing the image subject matter picture and position at a third time $T_{f/2}$; the first and second partial-resolution images are half-resolution images formed with masked and unmasked pixels in complementary checkerboard patterns; and displaying the first and second partial-resolution images includes combining the checkerboard patterns of the first and second partial-resolution images into a combined third full-resolution image; and then successively displaying the first and second partial-resolution images using the combined third full-resolution image.

* * * * *